(12) United States Patent
Hsieh

(10) Patent No.: US 7,849,461 B2
(45) Date of Patent: Dec. 7, 2010

(54) SYSTEM AND METHOD FOR LOADING A NETWORK CONFIGURATION PROGRAM ON A WIRED/WIRELESS NETWORK PRODUCT

(75) Inventor: Ming-Chih Hsieh, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 1032 days.

(21) Appl. No.: 11/608,802

(22) Filed: Dec. 9, 2006

(65) Prior Publication Data

US 2007/0288607 A1 Dec. 13, 2007

(30) Foreign Application Priority Data

Jun. 9, 2006 (CN) .................... 2006 1 0061076

(51) Int. Cl.
*G06F 9/445* (2006.01)
*G06F 15/16* (2006.01)
*G06F 15/177* (2006.01)

(52) U.S. Cl. .................... 717/174; 717/168; 717/171; 717/172; 717/176; 717/177; 709/217; 709/220; 709/221; 709/222

(58) Field of Classification Search .................. 717/174
See application file for complete search history.

(56) References Cited

U.S. PATENT DOCUMENTS

| 5,555,401 | A | * | 9/1996 | Allen et al. .................... 710/8 |
|---|---|---|---|---|
| 6,058,312 | A | | 5/2000 | Kimura |
| 6,336,152 | B1 | * | 1/2002 | Richman et al. ................ 710/8 |
| 6,567,860 | B1 | * | 5/2003 | Maxwell et al. ............. 719/327 |
| 6,728,787 | B1 | * | 4/2004 | Leigh ......................... 719/327 |
| 6,968,551 | B2 | * | 11/2005 | Hediger et al. ............... 717/174 |
| 6,976,252 | B2 | * | 12/2005 | White et al. ................. 717/174 |
| 7,100,038 | B2 | * | 8/2006 | Haswarey et al. .............. 713/2 |
| 7,150,025 | B2 | * | 12/2006 | Gentry et al. ............... 719/327 |
| 7,660,847 | B2 | * | 2/2010 | Bezanson et al. ........... 709/203 |
| 2002/0161939 | A1 | * | 10/2002 | Kim et al. ...................... 710/8 |

FOREIGN PATENT DOCUMENTS

TW  453068  9/2001
TW  561412  11/2003

* cited by examiner

*Primary Examiner*—Thomas K Pham
(74) *Attorney, Agent, or Firm*—Wei Te Chung

(57) ABSTRACT

A method for loading a network configuration program on a wired/wireless network product is provided. The method includes the steps of: installing a driver of a wireless network interface card (NIC) and corresponding software bundle in a flash memory (23) of the network product (2), the software bundle comprising a wired network configuration program and a wireless network configuration program; sending the driver to a peripheral bus (26) of the network product; receiving a signaled result from the peripheral bus; determining whether the network product is a wired network product or a wireless network product according to the signaled result; loading the wired network configuration program on the network product when the network product is a wired network product; and loading the wireless network configuration program on the network product when the network product is a wireless network product. A related system is also provided.

15 Claims, 4 Drawing Sheets

- WLAN Configuration
    - WLAN Assignment    Enable
        - ⦿ Manually Assignment
            - IP Address    192.168.0.100
            - Subnet Mask    255.255.0.0
            - Gateway Address    192.168.1.254
        - ○ DHCP Enable
- Gateway Select
    - ⦿ LAN(Ethernet)
    - ○ WLAN(Wireless)

- Wireless Interface Configuration
    - Connection Mode    Infrastructure
    - SSID
    - Wireless Channel    Channel 6
    - WEP Key State    Disable
    - WEP Key Type    ASCII
    - Encryption Mode    base 64
    - WEP Key
    - Confirm WEP Key

FIG. 4

SYSTEM AND METHOD FOR LOADING A NETWORK CONFIGURATION PROGRAM ON A WIRED/WIRELESS NETWORK PRODUCT

BACKGROUND OF THE INVENTION

1. Field of the Invention

The present invention generally related to systems and methods for loading a network configuration program, and more particularly, to a system and method for loading a network configuration program on a wired/wireless network product.

2. Description of Related Art

Currently, computer network has become an important means for helping business enterprises carry on the technique reformation and improve business enterprise management level. As the development of world information superhighway, acquiring information through computer network necessarily will bring huge economic and social benefit for business enterprises. The appearance of network product makes the interconnection of network possible, and makes tremendous contribution to the development of business enterprise information-based construction.

In digital design of network product, such as route, internet protocol camera (IP-CAM), or access point (AP), including two kinds of network: wired network and wireless network. The design of network products interfaces will be different in wired network data transmission and wireless network data transmission, thus it is necessary to provide two different loading systems for the wired network data transmissions and the wireless network data transmissions. If a same type network product has two different kinds: wired network product and wireless network product, the conventional solution is to provide two different kinds of network configuration programs for loading. The conventional solution will cause inconvenience and inefficiency when mass-produced, and has a possibility to loading a wrong network configuration program.

Accordingly, what is needed is a system and method for loading a network configuration program on a wired/wireless network product, which pack a wired network configuration program and a wireless network configuration program together, and determine the style of network product to load corresponding network configuration program. The system and method also can improve convenience, reduce cost, and avoid loading a wrong network configuration program.

SUMMARY OF THE INVENTION

One preferred embodiment provides a system for loading a network configuration program on a wired/wireless network product. The system includes an installing unit, a sending unit, a receiving unit, a determining unit, and a loading unit. The installing unit is configured for installing a driver of a wireless network interface card (NIC) and corresponding software bundle in a flash memory of the network product, the software bundle includes wired network configuration program and wireless network configuration program. The sending unit is configured for sending the drive messages of the driver to a peripheral bus of the network product. The receiving unit is configured for receiving a signaled result from the peripheral bus. The determining unit is configured for determining whether the network product is a wired network product or a wireless network product according to the signaled result. The loading unit is configured for loading the wired network configuration program on the network product when the network product is a wired network product, and for loading the wireless network configuration program on the network product when the network product is a wireless network product.

Another preferred embodiment provides a method for loading a network configuration program on a wired/wireless network product. The method includes the steps of: installing a driver of a wireless network interface card (NIC) and corresponding software bundle in a flash memory of the network product, the software bundle comprising wired network configuration program and wireless network configuration program; sending the drive messages of the driver to a peripheral bus of the network product; receiving a signaled result from the peripheral bus; determining whether the network product is a wired network product or a wireless network product according to the signaled result; loading the wired network configuration program on the network product when the network product is a wired network product; and loading the wireless network configuration program on the network product when the network product is a wireless network product.

Other systems, methods, features, and advantages will be or become apparent to one skilled in the art upon examination of the following drawings and detailed description.

BRIEF DESCRIPTION OF THE DRAWINGS

FIG. 4 is one of configuration interfaces of the wireless_ network configuration program.

DETAILED DESCRIPTION OF THE INVENTION

Figure 1:
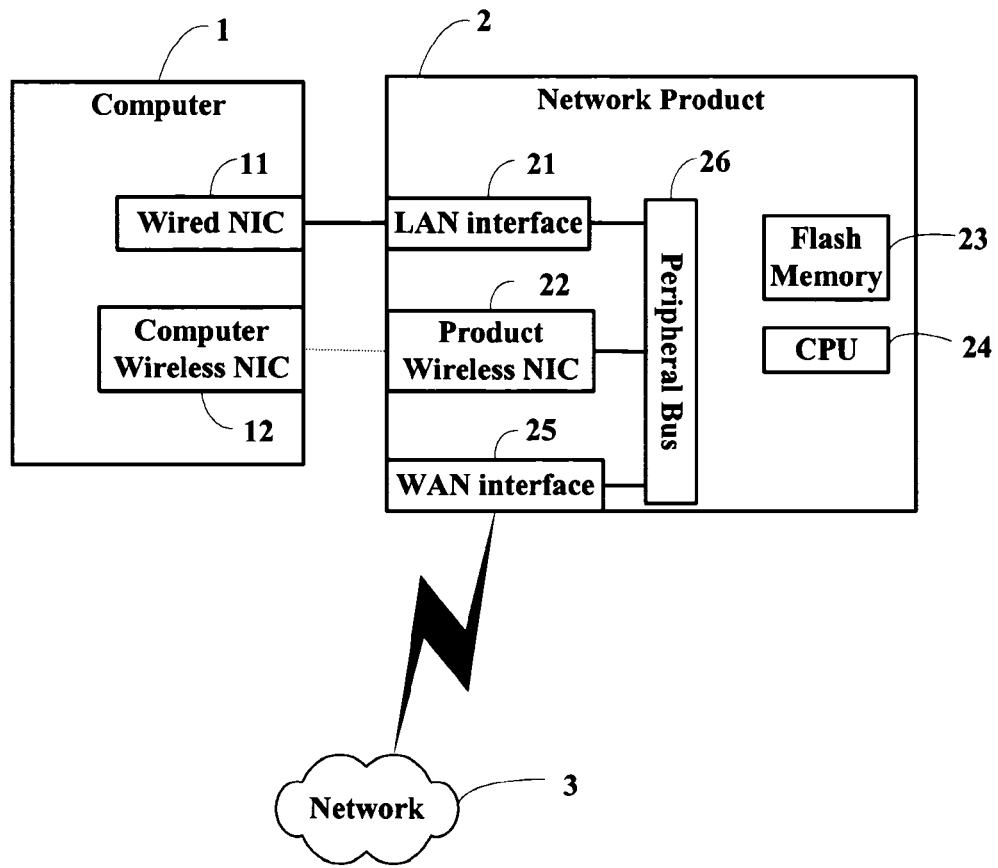
FIG. 1 is a schematic diagram of hardware configuration of a system for loading a network configuration program on a wired/wireless network product in accordance with one preferred embodiment.

FIG. 1 is a schematic diagram of hardware configuration of a system for loading network configuration program on a wired/wireless network product in accordance with one preferred embodiment. The hardware configuration may typically include a computer 1, a network product 2, and a network 3. The computer 1 may be an IBM architecture personal computer (PC), or any other type of computer. Typically, the computer 1 may include a wired NIC 11 and a computer wireless NIC 12. The computer 1 may further include other devices, such as a central processing unit (CPU), a memory, a harddisk, a monitor, a mouse, and a keyboard (not shown).

The network product 2 can be a wired network product or a wireless network product. If the network product 2 is a wired network product, such as a wired router, a wired internet protocol camera (IP-CAM), or a wired access point (AP), the network product 2 may include a local area network (LAN) interface 21, a flash memory 23, a central processing unit (CPU) 24, a wide area network (WAN) interface 25, and a peripheral bus 26. The peripheral bus 26 is connected with the LAN interface 21 and the WAN interface 25. The network product 2 is connected with the wired NIC 11 via the LAN interface 21, thus, the network product 2 can perform wired data transmissions with the computer 1. The network product 2 is further connected with the network 3 via the WAN interface 25.

Otherwise, if the network product 2 is a wireless network product, such as a wireless router, a wireless IP-CAM, or a wireless AP, the network product 2 further includes a product wireless NIC 22 coupled to the peripheral bus 26. Thus, not only can the network product 2 perform wired data transmissions with the computer 1 via the LAN interface 21, but can also perform wireless data transmissions with the computer 1 via the product wireless NIC 22 and the computer wireless NIC 12.

The wired NIC 11 may be an industry standard architecture (ISA) interface wired NIC, a personal computer memory card international association (PCMCIA) interface wired NIC, a peripheral component interconnect (PCI) interface wired NIC, or an universal serial bus (USB) interface wired NIC. The LAN interface 21 may be an attachment unit interface (AUI), a bayonet nut connector (BNC) interface, a RJ-45 interface, a fiber distributed data interface (FDDI), or an asynchronous transfer mode (ATM) interface.

The computer wireless NIC 12 may be a personal computer memory card international association (PCMCIA) wireless card, a peripheral component interconnect (PCI) wireless card, or an universal serial bus (USB) wireless card.

The flash memory 23 is configured for storing a driver of the product wireless NIC 22 and corresponding software bundle. In the preferred embodiment, the driver and the software bundle can be installed onto the flash memory 23 via a recorder (not shown). Wherein, the software bundle includes a wired network configuration program, a wireless network configuration program, and an auto detect program. The wired network configuration program are configured for initializing the network product 2 to perform wired data transmissions with the computer 1, and the wireless network configuration program are configured for initializing the network product 2 to perform wired or wireless data transmissions with the computer 1. The auto detect program is configured for receiving a signal from the CPU 24 to load corresponding network configuration program on the network product 2. The computer 1 is configured for transmitting data with the network product 2, browsing/viewing/editing configuration interfaces of the network product 2 corresponding to the wired/wireless network configuration program, and setting parameters of the network product 2 on the configuration interfaces.

The CPU 24 is configured for sending drive messages of the driver of to the peripheral bus 26, receiving a signaled result from the peripheral bus 26, and sending a signal to the auto detect program according to the signaled result. The WAN interface 25 may be a RJ-45 interface, an AUI, a high speed synchronous/asynchronous serial interface, or integrated services digital network-basic rate interface (ISDN BRI). The peripheral bus 26 is configured for transmitting data between the CPU 24 and peripheral equipments, such as the LAN interface 21, the WAN interface 25, and the product wireless NIC 22.

The network 3 may be an intranet, the Internet, or any other suitable type of communications link.

Figure 2:
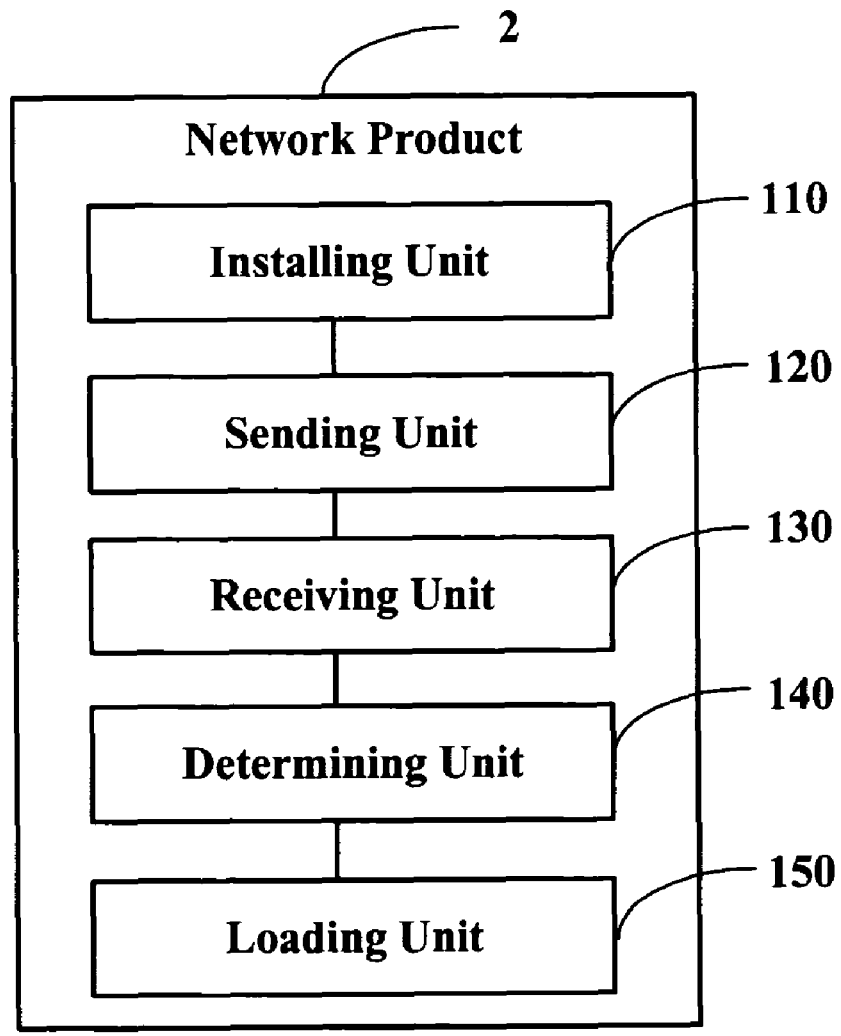
FIG. 2 is a schematic diagram of function modules of a network product in FIG. 1.

FIG. 2 is a schematic diagram of function modules of the network product 2. The network product 2 mainly includes an installing unit 110, a sending unit 120, a receiving unit 130, a determining unit 140, and a loading unit 150.

The installing unit 110 is configured for installing the driver of the product wireless NIC 22 and corresponding software bundle in the flash memory 23. Wherein, the software bundle includes a wired network configuration program, a wireless network configuration program, and an auto detect program.

The sending unit 120 is configured for sending drive messages of the driver to the peripheral bus 26.

The receiving unit 130 is configured for receiving a signaled result from the peripheral bus 26. In the preferred embodiment, if the product wireless NIC 22 has been successfully driven by the drive messages, the peripheral bus 26 returns a success signal to the CPU 24 as the signaled result; otherwise, if the product wireless NIC 22 does not exist or cannot be driven by the drive messages, the peripheral bus 26 does not return any signals to the CPU 24, that is to say, the CPU 24 receives a failure signal as the signaled result. Wherein, the success signal is basic information of the product wireless NIC 22 including frequency and speed of data transmission (for example 802.11b/g), manufacturer, and chip data.

The determining unit 140 is configured for determining whether the network product 2 is a wired network product or a wireless network product according to the signaled result received by the CPU 24. If the CPU 24 receives the success signal, the determining unit 140 determines that the network product 2 is a wireless network product, that is, the product wireless NIC 22 is attached to the network product 2 and is operable, and the determining unit 140 then sends a first signal (for example X=0) to the auto detect program. otherwise, if the CPU 24 receives the failure signal, the determining unit 140 determines that the network product 2 is a wired network product, that is, the product wireless NIC 22 is not coupled to or is not operable in the network product 2, the CPU 24 then sends a second signal (for example X=1) to the auto detect program.

The loading unit 150 is configured for loading the wired network configuration program or the wireless network configuration program on the network product 2 according to the result of the determining unit 140. Specifically, if the auto detect program receives X=1, the loading unit 150 loads the wired network configuration program on the network product 2, allowing the network product 2 to perform wired data transmissions with the computer 1, and enabling the computer 1 to browse first configuration interfaces of the network product 2 corresponding to the wired network configuration program. if the auto detect program receives X=0, the loading unit 150 loads the wireless network configuration program on the network product 2, allowing the network product 2 to perform wired and/or wireless data transmissions with the computer 1, and enabling the computer 1 to browse second configuration interfaces of the network product 2 corresponding to the wired network configuration program.

Wherein, the first configuration interfaces refer to corresponding wired data transmission settings, such as transfer control protocol/internet protocol (TCP/IP) setting, system setting that includes host identification and current state, wide area network (WAN) setting, local area network (LAN) setting, network address port translation (NAPT) setting, fire wall setting, and domain name server (DNS) setting. The second configuration interfaces also include the corresponding wired data transmission settings above-mentioned. Moreover, the second configuration interfaces further include other related wireless data transmission settings, which are shown in detail in FIG. 4, such as wireless local area network (WLAN) configuration, gateway select, and wireless interface configuration. Wherein, the WLAN configuration includes WLAN assignment, manually assignment, and dynamic host configuration protocol (DHCP) enable. The gateway select includes LAN and WLAN. The wireless interface configuration includes connection mode, service set identifier (SSID), wireless channel, wired equivalent privacy (WEP) key state, WEP key type, encryption mode, WEP key, confirm WEP key.

Figure 3:
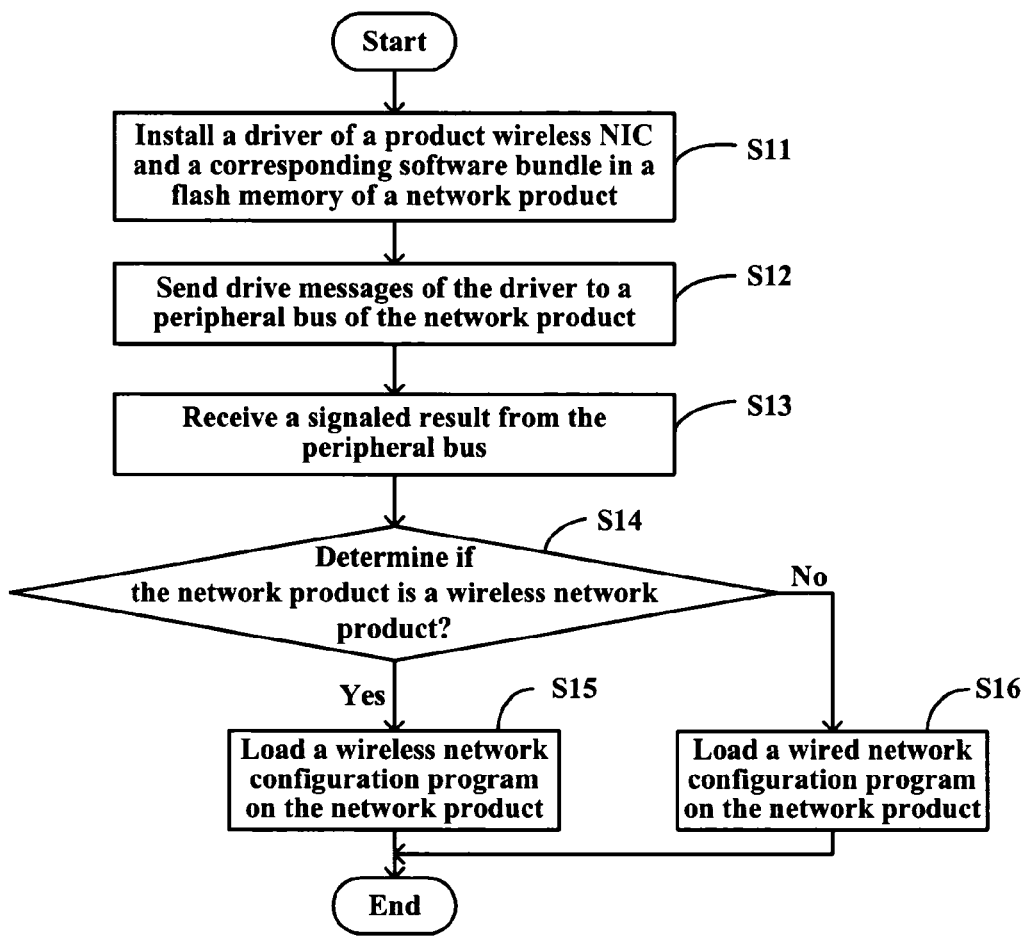
FIG. 3 is a flowchart of a method for loading a network configuration program on a wired/wireless network product in accordance with one preferred embodiment.

FIG. 3 is a flowchart of a method for loading a network configuration program on a wired/wireless network product in accordance with one preferred embodiment.

In step S11, the installing unit 110 installs the driver of the product wireless NIC 22 and the corresponding software bundle in the flash memory 23 via a recorder. Wherein, the software bundle includes a wired network configuration program, a wireless network configuration program, and an auto detect program.

In step S12, the sending unit 120 sends drive messages of the driver to the peripheral bus 26.

In step S13, the receiving unit 130 receives a signaled result from the peripheral bus 26. Specifically, if the product wireless NIC 22 has been successfully driven by the drive messages, the peripheral bus 26 returns a success signal to the CPU 24 as the signaled result; otherwise, if the product wireless NIC 22 does not exist or cannot be driven by the drive messages, the peripheral bus 26 does not return any signals to the CPU 24, that is to say, the CPU 24 receives a failure signal as the signaled result.

In step S14, the determining unit 140 determines whether the network product 2 is a wired network product or a wireless network product according to the signaled result received by the CPU 24. Specifically, if the CPU 24 receives the success signal, the determining unit 140 determines that the network product 2 is a wireless network product, that is, the product wireless NIC 22 is attached to the network product 2 and is operable, and then, the determining unit 140 sends a first signal (for example X=0) to the auto detect program; otherwise, if the CPU 24 receives the failure signal, the determining unit 140 determines that the network product 2 is a wired network product, that is, the product wireless NIC 22 is not coupled to or is not operable in the network product 2, and the determining unit 140 then sends a second signal (for example X=1) to the auto detect program.

In step S15, if the auto detect program receive X=0, the loading unit 150 loads the wireless network configuration program on the network product 2. Thus, the network product 2 can perform wired and/or data transmissions with the computer 1, and the computer 1 can browse second configuration interfaces of the network product 2 corresponding to the wired network configuration program.

In step S16, if the auto detect program receive X=1, the loading unit 150 loads the wired network configuration program on the network product 2. Thus the network product 2 can perform wired data transmissions with the computer 1, and the computer 1 can browse first configuration interfaces of the network product 2 corresponding to the wired network configuration program. Wherein, the first configuration interfaces refer to corresponding wired data transmission settings, such as transfer control protocol/internet protocol (TCP/IP) setting, system setting that includes host identification and current state, wide area network (WAN) setting, local area network (LAN) setting, network address port translation (NAPT) setting, fire wall setting, and domain name server (DNS) setting. The second configuration interfaces also include the corresponding wired data transmission settings above-mentioned. Moreover, the second configuration interfaces further include other related wireless data transmission settings, which are shown in detail in FIG. 4, such as wireless local area network (WLAN) configuration, gateway select, and wireless interface configuration. Wherein, the WLAN configuration includes WLAN assignment, manually assignment, and dynamic host configuration protocol (DHCP) enable. The gateway select includes LAN and WLAN. The wireless interface configuration includes connection mode, service set identifier (SSID), wireless channel, wired equivalent privacy (WEP) key state, WEP key type, encryption mode, WEP key, confirm WEP key.

It should be emphasized that the above-described embodiments of the preferred embodiments, particularly, any "preferred" embodiments, are merely possible examples of implementations, merely set forth for a clear understanding of the principles of the invention. Many variations and modifications may be made to the above-described preferred embodiment(s) without departing substantially from the spirit and principles of the invention. All such modifications and variations are intended to be included herein within the scope of this disclosure and the above-described preferred embodiment(s) and protected by the following claims.

What is claimed is:

1. A system for loading a network configuration program on a wired/wireless network product, the system comprising:
   an installing unit for installing a driver of a wireless network interface card (NIC) and corresponding software bundle in a flash memory of the network product, the software bundle comprising a wired network configuration program and a wireless network configuration program;
   a sending unit for sending the drive messages of the driver to a peripheral bus of the network product;
   a receiving unit for receiving a signaled result from the peripheral bus, wherein the signaled result is a success signal or a failure signal;
   a determining unit for determining whether the network product is a wired network product or a wireless network product according to the signaled result, wherein the success signal indicates that the network product is a wireless network product, and the failure signal indicates that the network product is a wired network product; and
   a loading unit for loading the wired network configuration program on the network product when the network product is a wired network product, and for loading the wireless network configuration program on the network product when the network product is a wireless network product.

2. The system according to claim 1, wherein the driver and the software bundle are recorded to the flash memory via a recorder.

3. The system according to claim 1, wherein the software bundle further comprises an auto detect program.

4. The system according to claim 1, wherein:
   the peripheral bus returns the success signal to a central processing unit (CPU) of the network product as the signaled result if the product wireless NIC has been successfully driven by the drive messages; or
   the peripheral bus returns the failure signal to the CPU of the network product as the signaled result if the product wireless NIC does not exist or cannot be driven by the drive messages.

5. The system according to claim 4, wherein the determining unit determines whether the network product is a wired network product or a wireless network product by:
   determining that the network product is a wireless network product if the CPU of the network product receives the success signal; or
   determining that the network product is a wired network product if the CPU of the network product receives the failure signal.

6. The system according to claim 5, wherein the determining unit further for:
   sending a first signal to the auto detect program if the network product is a wireless network product; or sending a second signal to the auto detect program if the network product is a wired network product.

7. The system according to claim 6, wherein the loading unit loads the wired network configuration program and the wireless network configuration program on the network product by:

loading the wireless network configuration program on the network product if the auto detect program receive the first signal; and loading the wired network configuration program on the network product if the auto detect program receive the second signal.

8. The system according to claim 6, wherein the first signal is X=0, and the second signal is X=1.

9. A method for loading a network configuration program on a wired/wireless network product, the method comprising the steps of:

installing a driver of a wireless network interface card (NIC) and corresponding software bundle in a flash memory of the network product, the software bundle comprising a wired network configuration program and a wireless network configuration program;

sending the drive messages of the driver to a peripheral bus of the network product;

receiving a signaled result from the peripheral bus, wherein the signaled result is a success signal or a failure signal;

determining whether the network product is a wired network product or a wireless network product according to the signaled result, wherein the success signal indicates that the network product is a wireless network product, and the failure signal indicates that the network product is a wired network product;

loading the wired network configuration program on the network product when the network product is a wired network product; and loading the wireless network configuration program on the network product when the network product is a wireless network product.

10. The method according to claim 9, wherein the software bundle further comprises an auto detect program.

11. The method according to claim 9, wherein:

the peripheral bus returns the success signal to a central processing unit (CPU) of the network product as the signaled result if the product wireless NIC has been successfully driven by the drive messages; or the peripheral bus returns the failure signal to the CPU of the network product as the signaled result if the product wireless NIC does not exist or cannot be driven by the drive messages.

12. The method according to claim 11, wherein the step of determining whether the network product is a wired network product or a wireless network product comprises:

determining that the network product is a wireless network product if the CPU of the network product receives the success signal; or determining that the network product is a wired network product if the CPU of the network product receives the failure signal.

13. The method according to claim 12, further comprising:

sending a first signal to the auto detect program if the network product is a wireless network product; or sending a second signal to the auto detect program if the network product is a wired network product.

14. The method according to claim 13, wherein the step of loading the wired network configuration program and the wireless network configuration program on the network product comprises:

loading the wireless network configuration program on the network product if the auto detect program receive the first signal; and loading the wired network configuration program on the network product if the auto detect program receive the second signal.

15. The method according to claim 13, wherein the first signal is X=0, and the second signal is X=1.

* * * * *